US012618546B2

(12) United States Patent
Yu

(10) Patent No.: US 12,618,546 B2
(45) Date of Patent: May 5, 2026

(54) LAMP

(71) Applicants: SUZHOU OPPLE LIGHTING CO., LTD., Suzhou City (CN); OPPLE LIGHTING CO., LTD., Shanghai (CN)

(72) Inventor: Qi'e Yu, Suzhou City (CN)

(73) Assignees: SUZHOU OPPLE LIGHTING CO., LTD., Suzhou City (CN); OPPLE LIGHTING CO., LTD., Shanghai (CN)

( * ) Notice: Subject to any disclaimer, the term of this patent is extended or adjusted under 35 U.S.C. 154(b) by 213 days.

(21) Appl. No.: 18/527,225

(22) Filed: Dec. 1, 2023

(65) Prior Publication Data

US 2024/0110690 A1 Apr. 4, 2024

Related U.S. Application Data

(63) Continuation of application No. PCT/US2022/096556, filed on Jun. 1, 2022.

(30) Foreign Application Priority Data

Jun. 4, 2021 (CN) ......................... 202121245022.6
Jun. 4, 2021 (CN) ......................... 202121245110.6
Jun. 4, 2021 (CN) ......................... 202121245113.X

(51) Int. Cl.
*F21V 17/00* (2006.01)
*F21S 8/02* (2006.01)
(Continued)

(52) U.S. Cl.
CPC ................ *F21V 21/04* (2013.01); *F21S 8/02* (2013.01); *F21V 17/005* (2013.01);
(Continued)

(58) Field of Classification Search
CPC ...... F21V 17/005; F21V 17/164; F21V 17/18; F21V 21/04–049; F21S 8/026
See application file for complete search history.

(56) References Cited

U.S. PATENT DOCUMENTS

2013/0286669 A1* 10/2013 Moser ................ F21V 19/0025
362/382

FOREIGN PATENT DOCUMENTS

CN 2687505 Y 3/2005
CN 101761824 A 6/2010
(Continued)

OTHER PUBLICATIONS

International Search Report of PCT/CN2022/096556 dated Aug. 11, 2022 with English translation, (8p).

*Primary Examiner* — Sean P Gramling
(74) *Attorney, Agent, or Firm* — Arch & Lake LLP; Hao Tan; Shen Wang

(57) ABSTRACT

The present disclosure discloses a lamp, including a lamp body and a cover ring sleeved on an outer side of a bottom of the lamp body, the lamp body is rotatable relative to the cover ring; an outer side wall of the bottom of the lamp body is provided with a first limiting member extending horizontally, and the first limiting member is configured to limit a position of the lamp body in a vertical direction; the first limiting member is provided with a second limiting member protruded outwardly; and an inner side wall of the cover ring is provided with a third limiting member corresponding to the second limiting member; in a case that the lamp body is rotated relative to the cover ring, the second limiting member and the third limiting member are interfered with each other to prevent the lamp body from rotating unrestrictedly.

6 Claims, 9 Drawing Sheets

(51) Int. Cl.
*F21V 17/16* (2006.01)
*F21V 21/04* (2006.01)
*F21V 23/00* (2015.01)
*F21V 29/76* (2015.01)

(52) U.S. Cl.
CPC .......... *F21V 17/164* (2013.01); *F21V 23/001* (2013.01); *F21V 29/763* (2015.01)

(56) References Cited

FOREIGN PATENT DOCUMENTS

| | | | |
|---|---|---|---|
| CN | 204593126 | U | 8/2015 |
| CN | 105674078 | A | 6/2016 |
| CN | 205350970 | U | 6/2016 |
| CN | 205447450 | U | 8/2016 |
| CN | 205664241 | U | 10/2016 |
| CN | 106704904 | A | 5/2017 |
| CN | 208620223 | U | 3/2019 |
| CN | 214790709 | U | 11/2021 |
| CN | 214790710 | U | 11/2021 |
| CN | 214790763 | U | 11/2021 |
| JP | 2015111635 | A | 6/2015 |
| JP | 2015215971 | A | 12/2015 |
| JP | 2017216082 | A | 12/2017 |

* cited by examiner

LAMP

CROSS-REFERENCE TO THE RELATED APPLICATION

This application is based upon and claims the priority of PCT patent application No. PCT/CN2022/096556 filed on Jun. 1, 2022 which claims priority to the Chinese patent application No. 202121245110.6 filed on Jun. 4, 2021, the Chinese patent application No. 202121245113.X filed on Jun. 4, 2021, and the Chinese patent application No. 202121245022.6 filed on Jun. 4, 2021, the entire contents of which are hereby incorporated by reference herein for all purposes.

TECHNICAL FIELD

The present disclosure relates to a technical field of lighting, in particular to a lamp.

BACKGROUND

At present, lamps are developing towards lighter weight and compactness. However, electric wires of existing spotlights need to be fixed by additionally using a dedicated crimping parts for wire fixation, which increases the cost. Moreover, after the spotlight is installed, the lamp body is relatively fixed and cannot be disassembled or difficult to be disassemble, so that it is necessary to dissemble a cover ring along with the lamp body, which is extremely inconvenient and easy to damage the ceiling, further sometimes results in it impossible for a secondary installation.

SUMMARY

The present disclosure provides a lamp and make the internal structure of the lamp compact.

The present disclosure provides a lamp, the lamp may include a lamp body and a cover ring sleeved on an outer side of a bottom of the lamp body, the lamp body is rotatable relative to the cover ring, and an outer side wall of the bottom of the lamp body is provided with a first limiting member extending horizontally, the first limiting member is configured to limit a position of the lamp body in a vertical direction; the first limiting member is provided with a second limiting member protruding outwardly; an inner side wall of the cover ring is provided with a third limiting member corresponding to the second limiting member; in a case that the lamp body is rotated relative to the cover ring, the second limiting member and the third limiting member are interfered with each other to prevent the lamp body from rotating unrestrictedly.

According to another aspect, the present disclosure provides a lamp, and the lamp may include a lamp body and a light source assembly arranged inside the lamp body, in which the light source assembly comprises a base substrate, a fixing bracket and a power line, the base substrate and the fixing bracket are fixedly connected to clamp and fix the power line between the base substrate and the fixing bracket.

According to a further aspect, the present disclosure further provides a lamp, and the lamp may include a lamp body and a cover ring assembled and fixed with the lamp body, in which the lamp body is provided with a first elastic member, and the lamp body is detachably connected with the cover ring through the first elastic member; a bottom of the first elastic member is formed with an operating member which is bent inwardly; and in a case that the operating member is pressed, the first elastic member is separated from the cover ring so that the lamp body is separated from the cover ring.

It is to be understood that both the foregoing general description and the following detailed description are exemplary and explanatory only and are not restrictive of the present disclosure.

DETAILED DESCRIPTION

In order to make objective, technical solution and advantages of the present disclosure more apparent, the present disclosure will be described in details in conjunction with the accompanying drawings and examples.

Here, it should be noted that, in order to avoid obscuring the present disclosure with unnecessary details, only structures and/or processing steps closely related to the technical solution of the present disclosure are shown in the accompanying drawings, while other details that are barely related to the present disclosure are omitted.

In addition, it should be noted that, the terms "comprising", "including" or any other variation thereof are intended to cover non-exclusive inclusion(s), so that a process, method, article, or equipment including a series of elements includes not only those elements, but also other elements not explicitly listed, or elements inherent to such process, method, article, or equipment.

Sometimes, an angle of the spotlight is adjustable, which allows for flexibility and multiformity of the spotlight. However, during a rotation of the spotlight, if there is no limiting structure, the lamp will be rotated unrestrictedly and the electric wires will be twisted, which will lead to safety hazards. Nevertheless, lamps provided with limiting structures are all assembled by adding extra components, which increases the cost and may also destroy the original overall appearance of the lamps.

As shown in FIG. 1 to FIG. 14, the present disclosure reveals a lamp 100. The lamp 100 is provided with a connection structure, which is convenient for installation and disassembly and can be used in spotlights. Of course, in other examples of the present disclosure, the connection structure can also be used in other forms of lamps, which is neither described in details here nor is limited. For the sake of clarity, in the following description, a specific structure of the lamp 100 will be described in details with reference to the case where the connection structure is applied in the lamp 100 by way of example.

Figure 1:
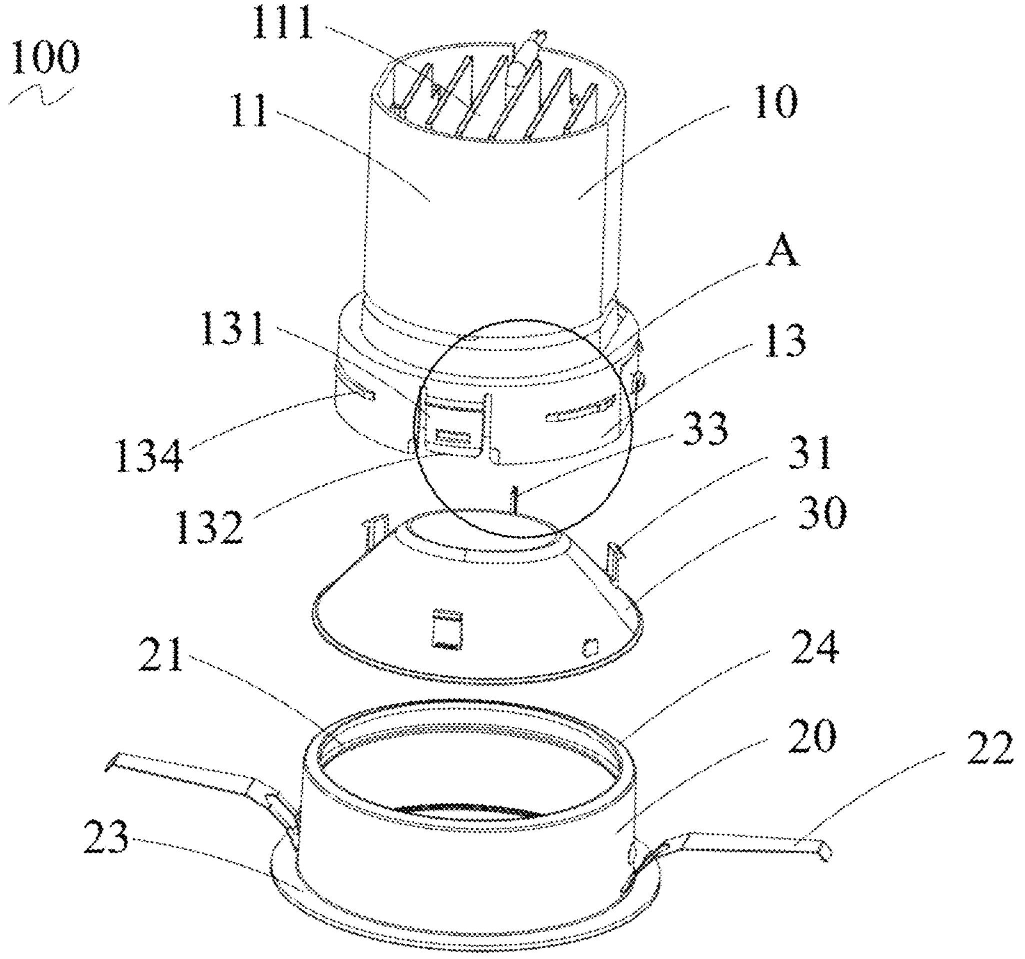
FIG. 1 is a schematic diagram illustrating an exploded structure of a lamp in accordance with an example of the present disclosure.
Figure 2:
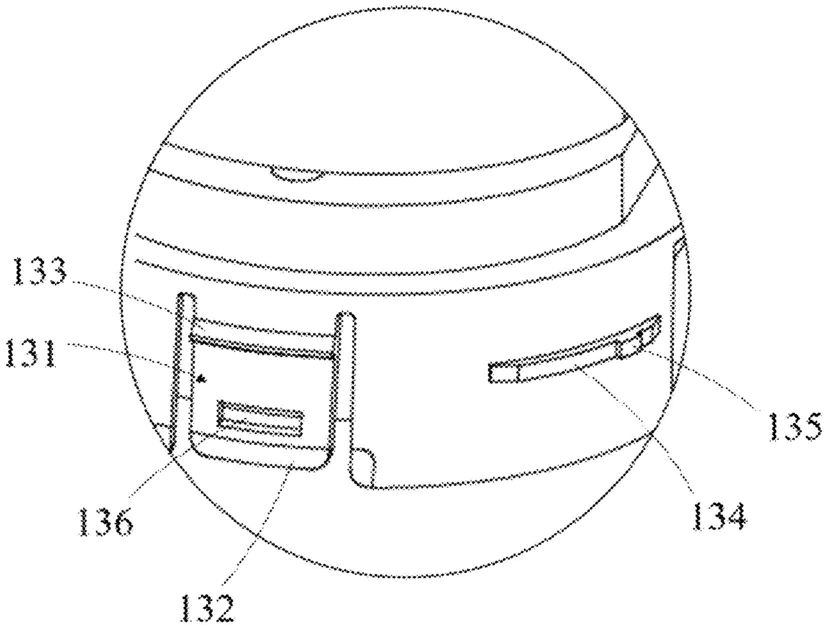
FIG. 2 is an enlarged view of a structure at A in FIG. 1.
Figure 3:
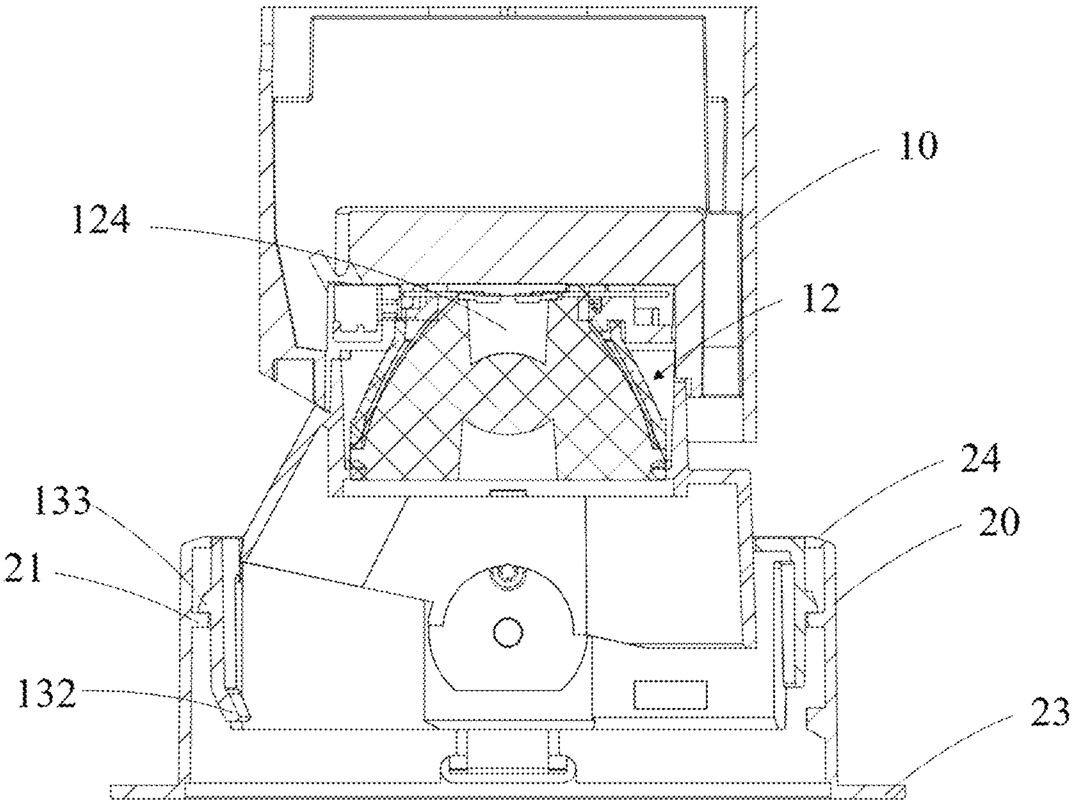
FIG. 3 is a cross-sectional side view of a lamp in accordance with an example of the present disclosure.
Figure 4:
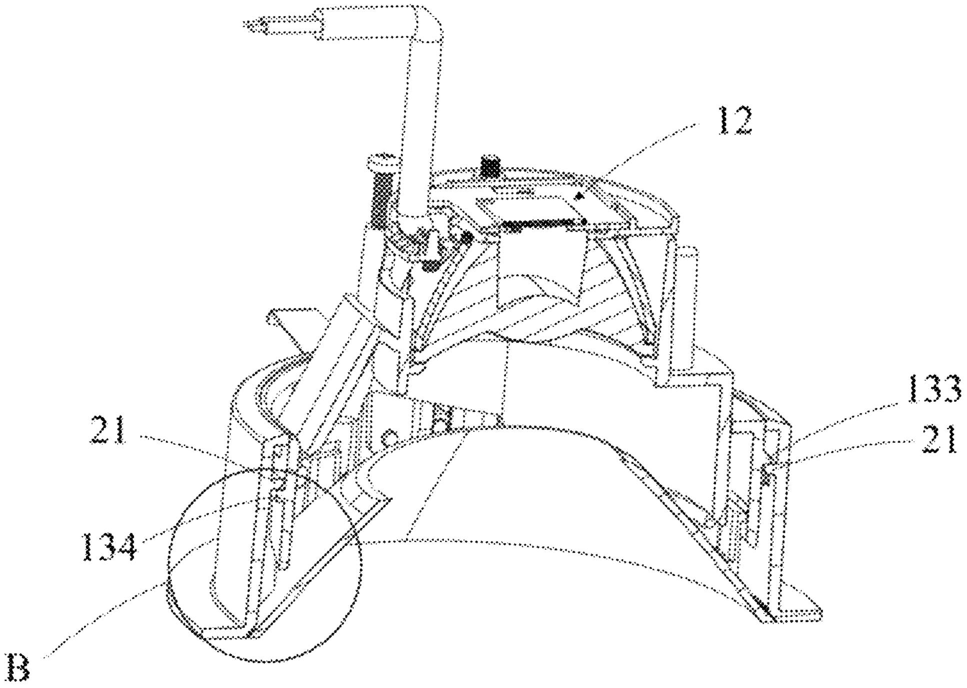
FIG. 4 is a cross-sectional view of a three-dimensional structure of a lamp in accordance with an example of the present disclosure.

As shown in FIG. 1 to FIG. 3, the lamp 100 includes a lamp body 10 and a cover ring 20. The lamp body 10 includes an upper shell 11, a light source assembly 12 and a lower shell 13, which are arranged sequentially from top to bottom. The upper shell 11 and the lower shell 13 are fastened with each other by bolts, and the light source assembly 12 is arranged between the upper shell 11 and the lower shell 13. Of course, in other examples of the present disclosure, the upper shell 11 and the lower shell 13 can also be fastened with each other by means of a clamping structure or a threaded structure, which is not limited herein.

In an example of the present disclosure, an interior of the upper shell 11 is provided with a heat dissipation assembly 111 connected with the light source assembly 12. The upper shell 11 is cylindrical in shape, and the heat dissipation assembly 111 is arranged inside the cylindrical upper shell 11. The heat dissipation assembly 111 includes a plurality of fins (not labeled), the plurality of fins are parallel to each other and arranged in a vertical direction, so as to increase a contact area with air to improve the capacity of heat exchange. Further, the heat dissipation assembly 111 may further include a heat dissipation fan (not shown), the heat dissipation fan is arranged in the fin and configured to enhance a heat dissipation effect that is act on the light source assembly 12. The lower shell 13 is also cylindrical in shape, and a radius of the lower shell 13 is greater than that of the upper shell 11, so that the upper shell 11 is partially nested in the lower shell 13. A cavity is formed in the lower shell 13 and configured to allow light from the light source assembly 12 to exit therethrough.

As shown in FIG. 3, FIG. 4, and FIG. 8 to FIG. 10, the light source assembly 12 includes a base substrate 121, a light source (not shown), a fixing bracket 122, a power line 123 and a primary optical element 124 which are sequentially arranged from top to bottom. The light source is arranged under the base substrate 121, and light emitted from the light source is irradiated downwardly. The fixing bracket 122 is correspondingly provided with a light exiting hole 1227 for the light emitted from the light source to exit. A bottom of the upper shell 11 is provided with an abutment surface 112 to be cooperated with the fixing bracket 122, and the abutment surface 112 is provided with an installation hole, and the installation hole can be a screw hole or a wire hole through which the power line 123 passes. The fixing bracket 122 is configured to clamp the base substrate 121 between the abutment surface 112 and the fixing bracket 122, a rear surface of the base substrate 121 is attached with the upper shell 11, and a thermal conductive silicone grease can be coated between the base substrate 121 and the upper shell 11 to enhance the heat dissipation effect. In other examples of the present disclosure, the base substrate 121 can also be spaced apart from the upper shell 11. The light source can be a combination of multiple LEDs or a COB light source, and the primary optical element 124 can be a lens module configured to collect light and improve light efficiency, which can be particularly set as required and will not be limited herein. The primary optical element 124 is arranged in the cavity, and is arranged directly below the light exiting hole 1227, so that the light emitted by the light source passes through the primary optical element 124 to be irradiated towards the outside of the lamp 100.

Figure 8:
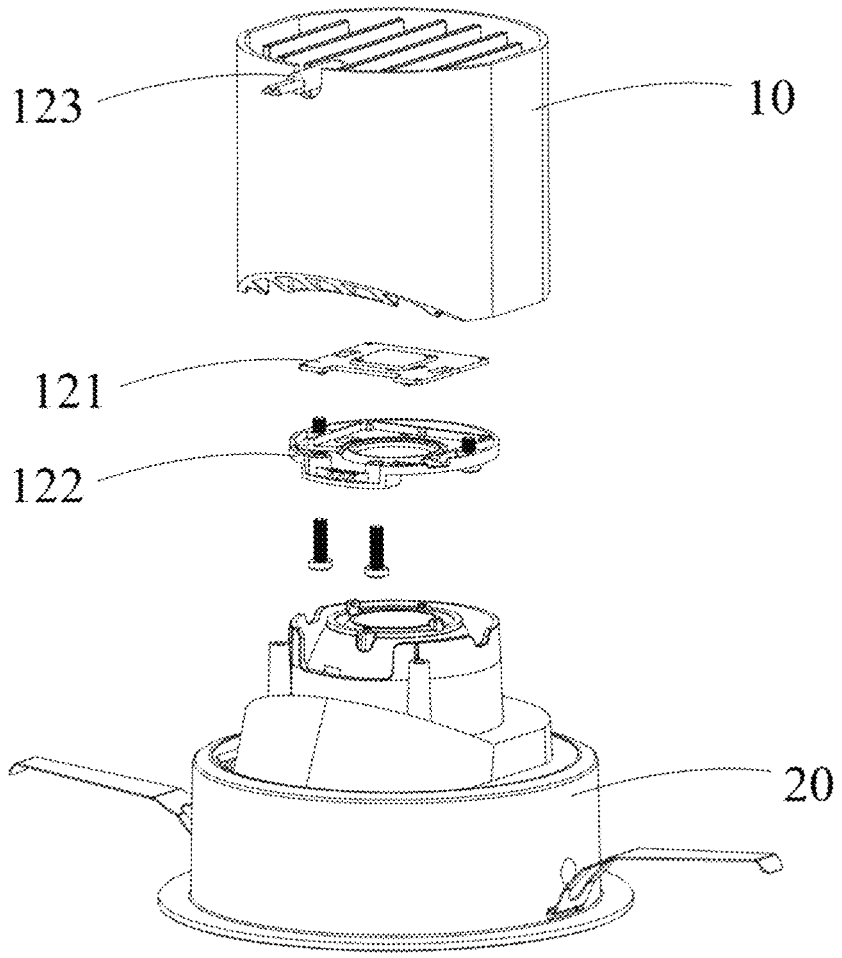
FIG. 8 is a schematic diagram illustrating an exploded structure of a light source assembly of a lamp in accordance with an example of the present disclosure.
Figure 9:
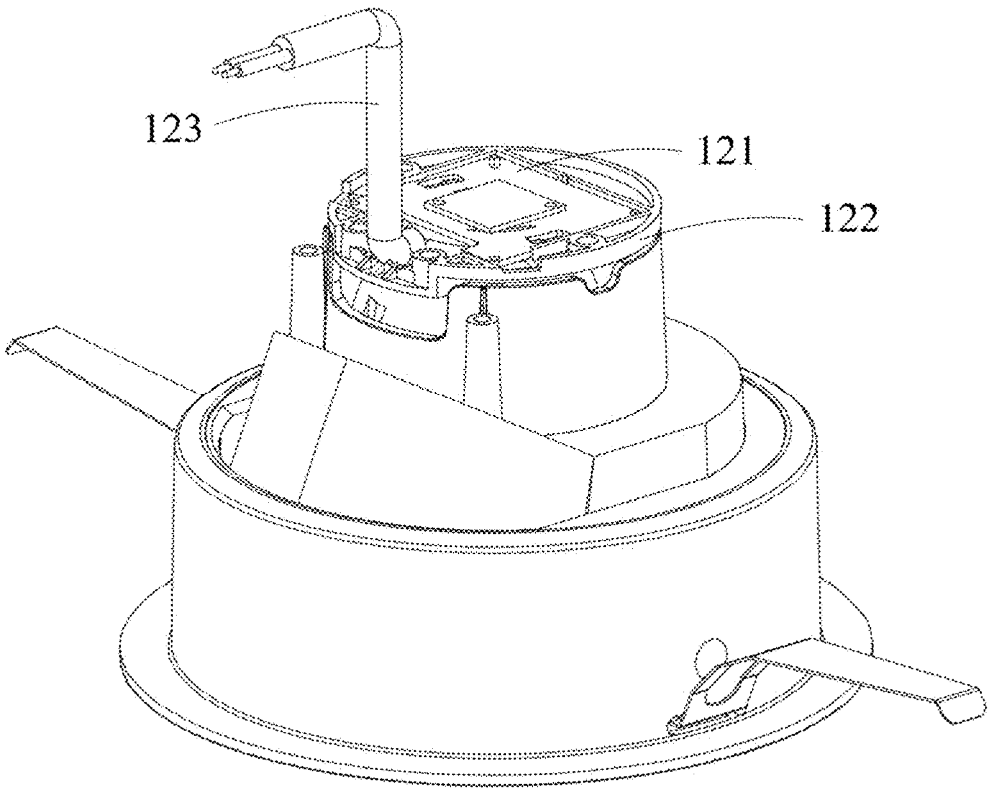
FIG. 9 is a schematic structural diagram illustrating a wire fixation of a power line in a light source assembly of the present disclosure.
Figure 10:
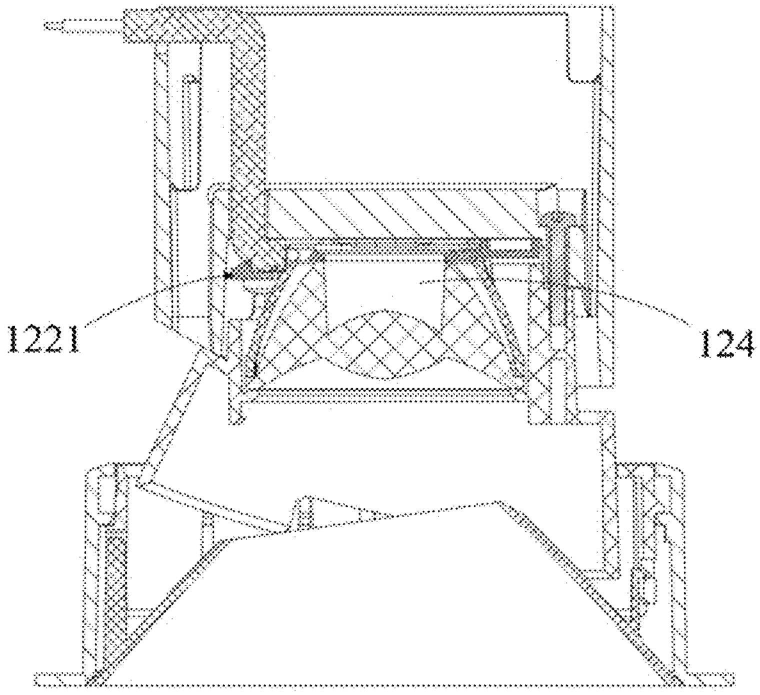
FIG. 10 is a cross-sectional side view of a lamp in accordance with an example of the present disclosure.
Figure 11:
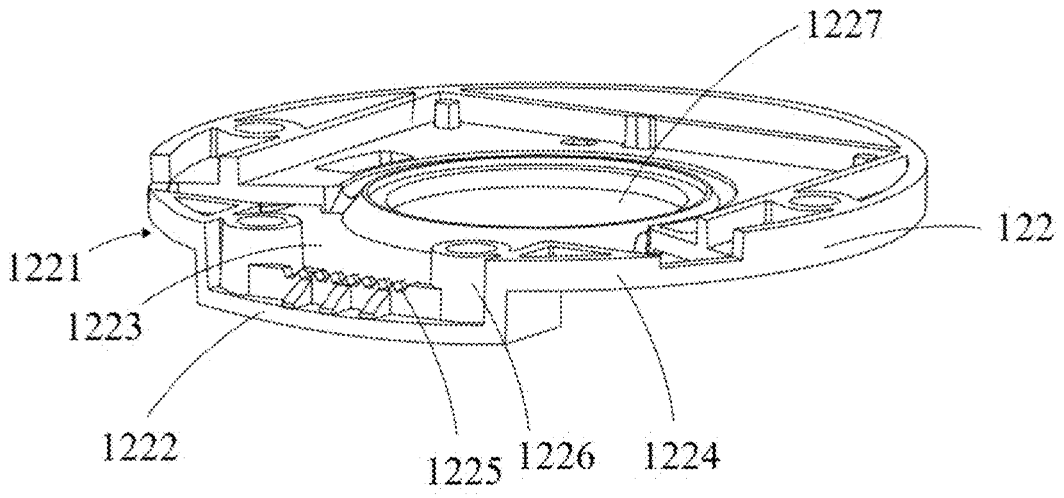
FIG. 11 is a three-dimensional structural diagram of a light source component of a lamp in accordance with an example of the present disclosure.
Figure 12:
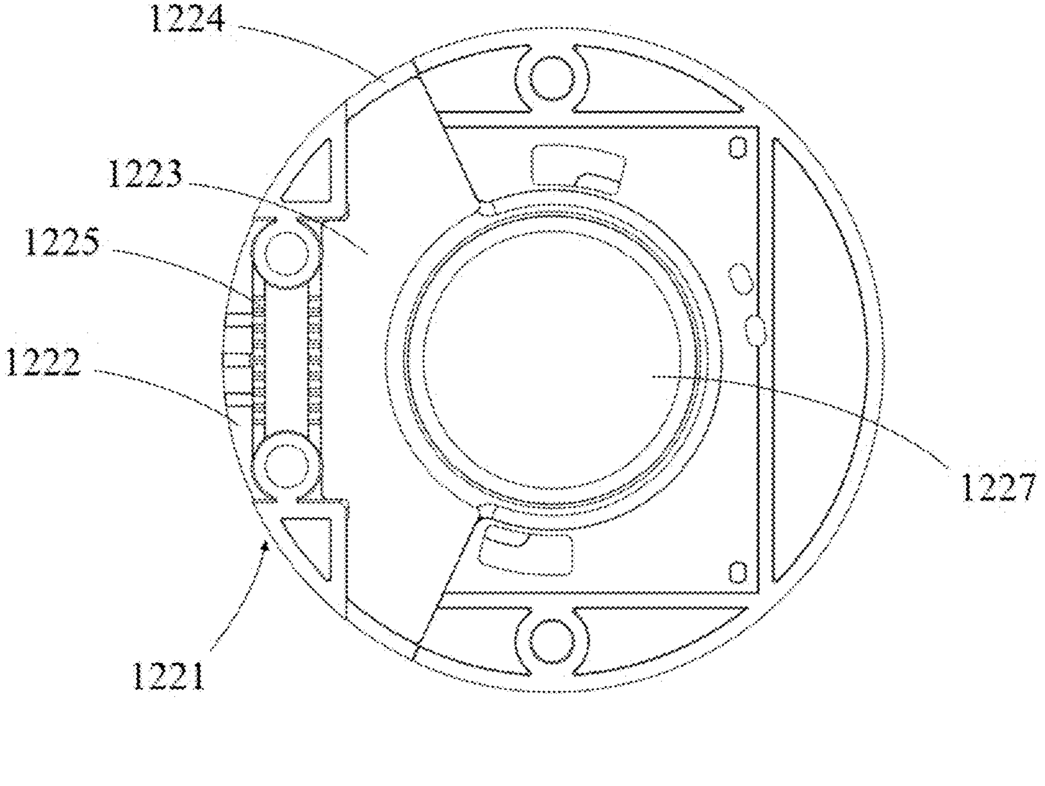
FIG. 12 is a top view of a light source assembly of a lamp in accordance with an example of the present disclosure.

As shown in FIG. 8, FIG. 11, and FIG. 12, in the above mentioned example, the base substrate 121 and the fixing bracket 122 are fixedly connected with each other by a fastener (not labeled), which can be a bolt or other structures. One end of the power line 123 is welded and fixed below the base substrate, and extends out of the base substrate 121. The fixing bracket 122 is configured to install the base substrate 121, and to clamp and arrange the power line 123 between the base substrate 121 and the fixing bracket 122 to achieve a wire fixation of the power line 123.

In an example of the present disclosure, the fixing bracket 122 is arranged below the base substrate 121, and one side of the fixing bracket 122 is provided with a wire fixing member 1221 formed by extending downwardly for fixing the power line 123. Further, the wire fixing member 1221 is partially cut away to expose a welding window of the base substrate 121, through which the power line 123 can be welded onto the base substrate 121 or a welding joint can be repaired. The wire fixing member 1221 is recessed downwardly from a plane where the fixing bracket 122 is located, to form a concave part 1222 for accommodating the power line 123. Two sides of the concave part 1222 are provided with a locking part 1226 respectively, and the concave part 1222 is connected to the abutment surface 112 through the locking part 1226 to clamp and arrange the power line 123 between the abutment surface 112 and the concave part 1222. The locking parts 1226 are arranged on two sides of the concave part, and locking holes are formed in the locking parts 1226, so that the concave part 1222 and the abutment surface 112 can be locked and fixed with each other by using locking members to pass through the locking holes. Further, the fins are perpendicular to the abutment surface 112 and are arranged above the abutment surface 112. When the fixing bracket 122 is connected to the abutment surface 112, the abutment surface 112 is abutted against the base substrate 121, that is, the heat generated by the base substrate 121 is transferred to the abutment surface 112 and the fins in sequence to complete the heat dissipation. In another example of the present disclosure, the fixing bracket 122 can also be arranged above the base substrate 121; correspondingly, the power line 123 is connected to the above of the base substrate 121, and the concave part 1222 can be recessed upwardly, which can be particularly arranged as required and will not be limited herein.

Specifically, due to a height difference between the fixing bracket 122 and the concave part 1222, a wire outlet hole 1223 is formed between and enclosed by the base substrate 121 and the concave part 1222, and the power line 123 extends out of the lamp body through the wire outlet hole 1223. Two sides of the concave part 1222 are provided with a cantilever 1224 respectively, and the concave part 1222 is connected to the fixing bracket 122 through the cantilevers 1224. The concave part 1222 is elastically deformable relative to the fixing bracket 122 by means of the cantilever 1224, so as to be adapted to the shape of the power line 123, thereby improving the structural stability. Preferably, the fixing bracket 122 is also provided with reinforcing ribs (not labeled) to further enhance the structural strength.

Further, the concave part 1222 is provided with a sawtooth structure 1225 abutted against the power line 123. The sawtooth structure 1225 increases a friction between the power line 123 and the concave part 1222 to prevent the power line 123 from moving. In other examples of the present disclosure, the sawtooth structure 1225 can also be arranged at other position(s) between the power line 123 and the base substrate 121 or the fixing bracket 122, which can be particularly set as required and will not be limited herein.

Figure 13:
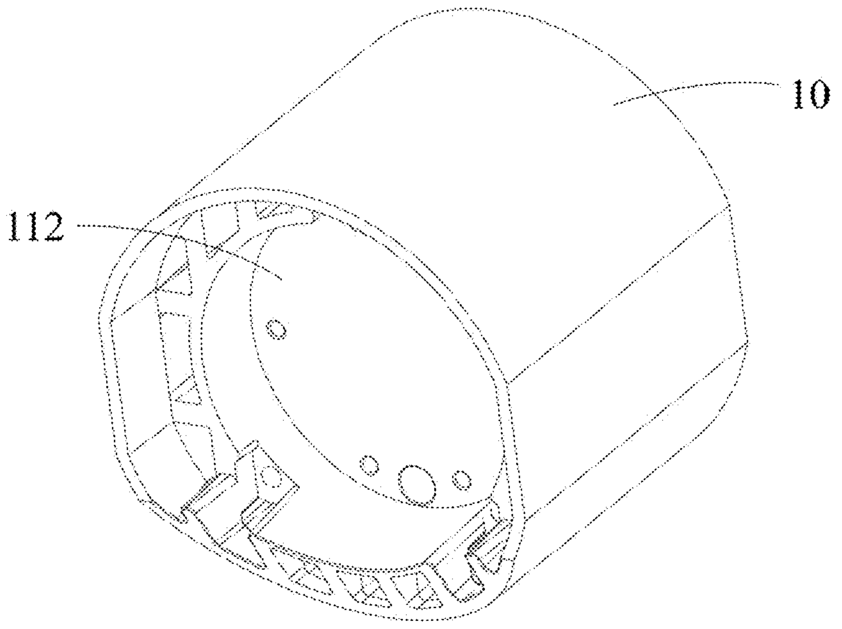
FIG. 13 is a schematic structural diagram of an upper shell of a lamp in accordance with an example of the present disclosure.

As shown in FIG. 13, an accommodating cavity for accommodating the fixing bracket 122 and the base substrate 121 is formed between and enclosed by the abutment surface 112 and an inner side wall of the upper shell 11. The fixing bracket 122 is fixed in the accommodating cavity of the upper shell 11 through a fastener. The abutment surface 112, the fixing bracket 122 and the lower shell 13 are respectively provided with a plurality of corresponding installation holes for fastening, and the fastener is provided in the installation holes for installing from top to bottom. The fastener passes through the abutment surface and the fixing bracket 122 from the above of the upper shell 11 until entering the lower shell 13, so that the base substrate 121 is closely engaged with the abutment surface 112, the wire fixing member 1221 is closely engaged with the abutment surface 112 to fix the power line 123, and the light source is closely engaged and aligned with the primary optical element 124, thereby completing the assembly of the lamp 100.

Figure 14:
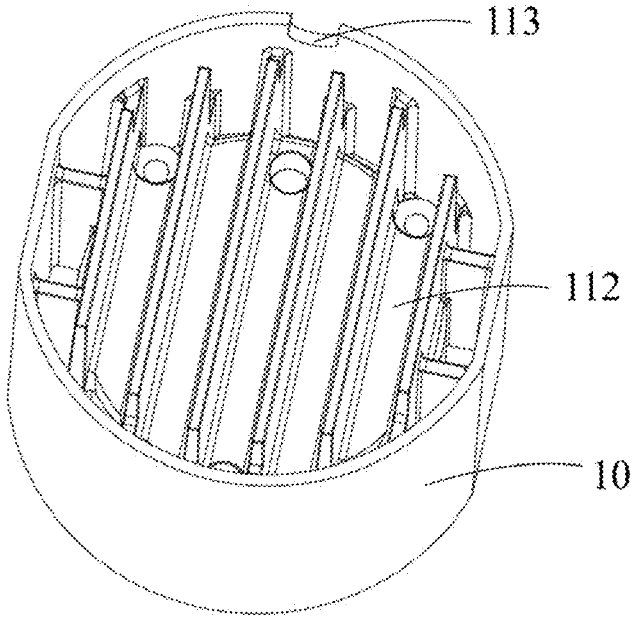
FIG. 14 is a schematic structural diagram of an upper shell of a lamp in accordance with an example of the present disclosure from another perspective.

As shown in FIG. 14, in other examples of the present disclosure, an upper end of the upper shell 11 is provided with a wire outlet slot 113 for partially accommodating the power line 123. The wire outlet slot 113 is formed in a side edge of the upper shell 11. The power line 123 passes through the wire outlet hole 1223 to reach the installation hole in the upper shell 11, and extends out of the lamp body 10 along the wire outlet slot 113.

The cover ring 20 is installed at a lower end of the lamp body 10, that is, installed at a circumferential outer side of the lower shell 13. The lower end of the lower shell 13 is provided with a first elastic member 131 extending in the vertical direction, and the cover ring 20 is detachably connected with the lamp body 10 through the first elastic member 131. Specifically, the first elastic member 131 is formed by the lower shell 13, an opening is formed between two sides of the first elastic member 131 and the lower shell 13, and an upper end of the first elastic member 131 is connected to the lower shell 13, so that the first elastic member 131 is elastically deformable relative to the lower shell 13. Preferably, in the present example, three first elastic members 131 are provided, and these three first elastic members 131 can be distributed at 120 degrees. Of course, the specific angle can be set as required, and the number of the first elastic members 131 is not limited to three, either.

As shown in FIG. 3, in another example of the present disclosure, a free end of the first elastic member 131 is formed with an inwardly bent operating member 132 for manual operation, and the first elastic member 131 can be elastically deformed by pressing the operating member 132, so that the lamp body 10 can be separated from the cover ring 20. In other examples of the present disclosure, the operating member 132 includes, but is not limited to, other forms such as a handle or a pull tab. The specific structure of the operating member 132 is not limited to be bent inwardly but can also be protruded inwardly from the first elastic member 131, as long as it is convenient for an operator to operate manually, which is not limited herein.

Furthermore, an inner side wall of the cover ring 20 is provided with a boss 21 which is annular and protruded, a radius of the boss 21 is slightly greater than that of the lower shell 13. An outer wall surface of the first elastic member 131 is provided with a clamping member 133, the clamping member 133 extends horizontally and outwardly from the outer wall surface of the first elastic member 131 and is configured to be clamped-fitted with the boss 21. One side of a lower end of the boss 21 facing the clamping member 133 is provided with a guide slope, and an upper end of the clamping member 133 is correspondingly provided with a guide slope facing the boss 21. The guide slope of the clamping member 133 is cooperated with the guide slope of the boss 21. When the lamp body 10 is cooperated and assembled with the cover ring 20, the boss 21 and the clamping member 133 are staggered relative to each other through these two guide slopes, so that the first elastic member 131 is deformed. The first elastic member 131 is restored until the clamping member 133 moves to the above of the boss 21, and a lower end of the clamping member 133 is abutted against the upper end of the boss 21, so that the boss 21 supports the clamping member 133 to install and fix the lamp body 10 inside the cover ring 20. It should be noted that, when the lamp body 10 needs to be disassembled, it only requires to pull the operating member 132 to detach the clamping member 133 from the boss 21.

Figure 6:
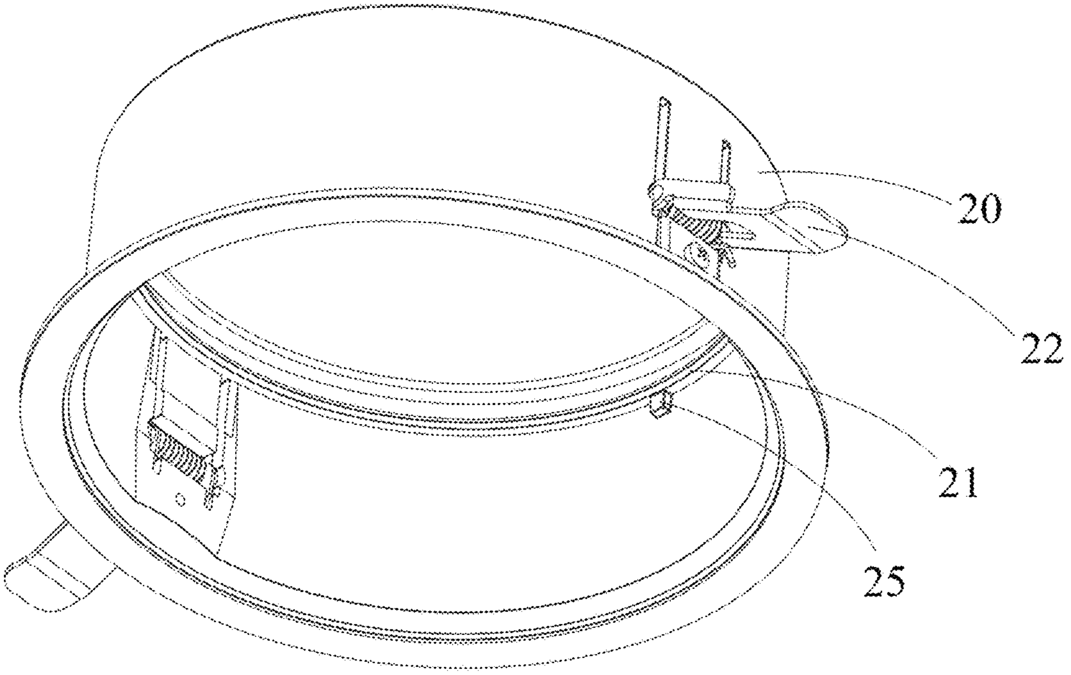
FIG. 6 is a schematic structural diagram of another example of a third elastic member in FIG. 1.

As shown in FIG. 6, in another example of the disclosure, an outer side of the cover ring 20 is further provided with a pair of third elastic members 22 which are distributed on two sides of the cover ring 20 along a radial direction of the cover ring 20. The cover ring 20 is abutted against and installed on the installation surface through the third elastic members 22. In practical disclosure, the third elastic members 22 may be snap springs or buckles, which can be particularly set as required and will not be limited herein. Further, the two sides of the cover ring 20 in the radial direction are also provided with through holes (not labeled) for the pair of third elastic members 22 to pass therethrough. The third elastic member 22 has one end fixed at the inner side of the cover ring 20 through a bolt, and the other end extending to the outer side of the cover ring 20 through the through holes. The third elastic member 22 is formed with a radian along an installation direction, which is convenient for installation and disassembly. It should be understood that, the third elastic member 22 includes but is not limited to the above-mentioned fixing methods, and can also be welded onto or clamped at an outer surface of the lower shell 13, or clamp-fitted therewith through a V-shaped elastic piece, which is not limited herein.

In other examples of the present disclosure, an outer side of a bottom of the cover ring 20 is provided with a first baffle 23 extending horizontally and outwardly. The first baffle 23 is annular in shape and is configured to shield a gap between the cover ring 20 and the installation surface. An inner side of a top of the cover ring 20 is provided with a second baffle 24 extending horizontally and inwardly. The second baffle 24 is annular in shape, and a radius of the second baffle 24 is slightly greater than that of the lower shell 13, that is, the second baffle 24 is attached onto the lower shell 13 to prevent dust from entering the interior of the lamp body 10.

In an example of the present disclosure, a surface of a side wall of the lower shell 13 is provided with a first limiting member 134. The first limiting member 134 extends horizontally in a manner of being tightly attached with the side wall of the lower shell 13, and has an arc shape. The first limiting member 134 is configured to limit a position of the lamp body 10 in the vertical direction. Specifically, a horizontal height of the first limiting member 134 is lower than that of the clamping member 133; that is, the clamping member 133 is arranged at a higher position on the side wall of the lower shell 13, the first limiting member 134 is arranged at a lower position on the side wall of the lower shell 13, and the clamping member 133 and the first limiting member 134 are staggered relative to each other in the vertical direction. A horizontal height of the boss 21 of the cover ring 20 is between the clamping member 133 and the first limiting member 134; that is, the boss 21 is located below the clamping member 133 and above the first limiting member 134. The first limiting member 134 is configured to prevent the lamp body 10 from extending inwardly too far during installation.

Further, as shown in FIG. 2 and FIG. 6, the first limiting member 134 is provided with a second limiting member 135 thereon. The second limiting member 135 is arranged on an outer wall surface of a side wall of the first limiting member 134 and is protruded horizontally and outwardly, and a length of the second limiting member 135 is smaller than that of the first limiting member 134. The inner side wall of the cover ring 20 is provided with a third limiting member 25 corresponding to the second limiting member 135. The third limiting member 25 is protruded horizontally and inwardly from the inner side wall of the cover ring 20, and is arranged below the boss 21. The second limiting member 135 and the third limiting member 25 are located on a same rotation track. When the lamp body 10 is rotated relative to the cover ring 20, the second limiting member 135 is abutted against the third limiting member 25 to prevent the lamp body 10 from rotating unrestrictedly, and also prevent the power line 123 in the lamp body 10 from winding.

Specifically, three first limiting members 134 are preferably provided, and each of the first limiting members 134 is located between adjacent first elastic members 131; that is, the first limiting members 134 and the first elastic members 131 are staggered relative to each other sequentially. Preferably, at least one of the first limiting members 134 is provided with the second limiting member 135. Of course, three second limiting members 135 may also be provided, and a rotation angle of the lamp body 10 is limited by providing the second limiting members 135 at different positions, which is not limited herein. It should be noted that, in a case where one second limiting member 135 and one third limiting member 25 are provided, the lamp body 10 can be unidirectionally rotated relative to the cover ring 20 by a maximum angle of 0 degree to 354 degrees, which can satisfy various requirements for angle adjustment. It should be noted that, lengths of the second limiting member 135 and the third limiting member 25 will affect the rotation angle of the lamp body 10 relative to the cover ring 20. When volumes of the second limiting member 135 and the third limiting member 25 are small enough, the maximum value of the rotation angle will approach 360 degrees, which can be particularly set as required and will not be limited herein.

Preferably, the lamp body 10 is further provided with a secondary optical element 30. The secondary optical element 30 can be a reflective cup and is configured to further concentrate light and improve the light efficiency. In the present example, the primary optical element 124 and the secondary optical element 30 may be integrally arranged, and both the primary optical element 124 and the secondary optical element 30 can be made of glass or plastic materials. Of course, the primary optical element 124 and the secondary optical element 30 can also be assembled with each other; that is, the primary optical element 124 can be detachably installed in the secondary optical element 30, which can be particularly set as required and will not be limited herein. The secondary optical element 30 is detachably connected to the lower shell 13. Specifically, the first elastic member 131 is provided with a cooperating member 136, which has a clamping slot structure and is arranged below the clamping member 133. An outer peripheral wall of the secondary optical element 30 is provided with a second elastic member 31 extending towards the lamp body 10. The second elastic member 31 includes but is not limited to a snap-fitted structure, and the snap-fitted structure is arranged at a terminal end of the second elastic member 31. The second elastic member 31 can be embedded into the cooperating member 136 so that the secondary optical element 30 is clamp-fitted at the lower end of the lower shell 13.

Figure 5:
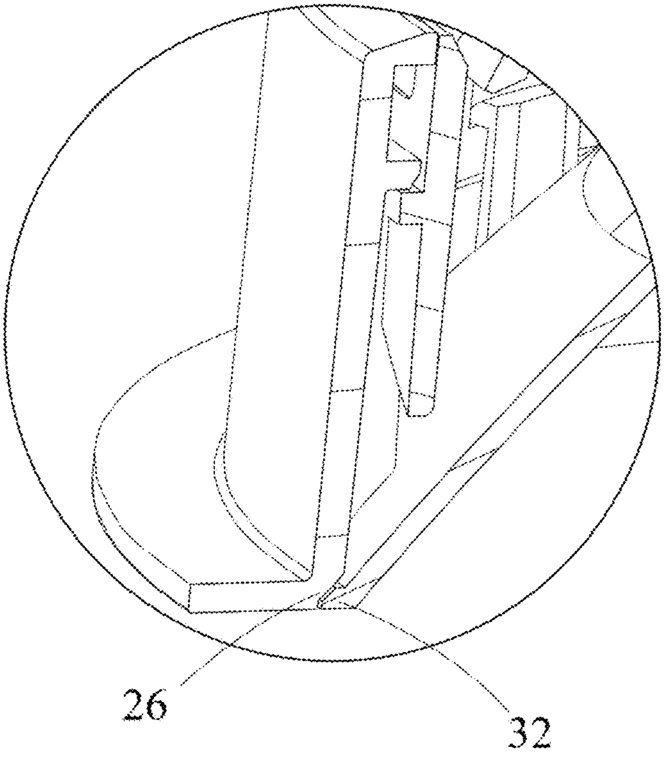
FIG. 5 is an enlarged view of a structure at B in FIG. 4.

Further, as shown in FIG. 5, an opening of the secondary optical element 30 is further provided with a flange 32, and an annular groove 26 is formed at a corner of an inner side of the bottom of the cover ring 20. The groove 26 is chamfered and is attached with the flange 32, and the flange 32 of the secondary optical element 30 is limited and accommodated in the groove 26, so that a lower bottom surface of the secondary optical element 30 is flush with a lower bottom surface of the cover ring 20.

Figure 7:
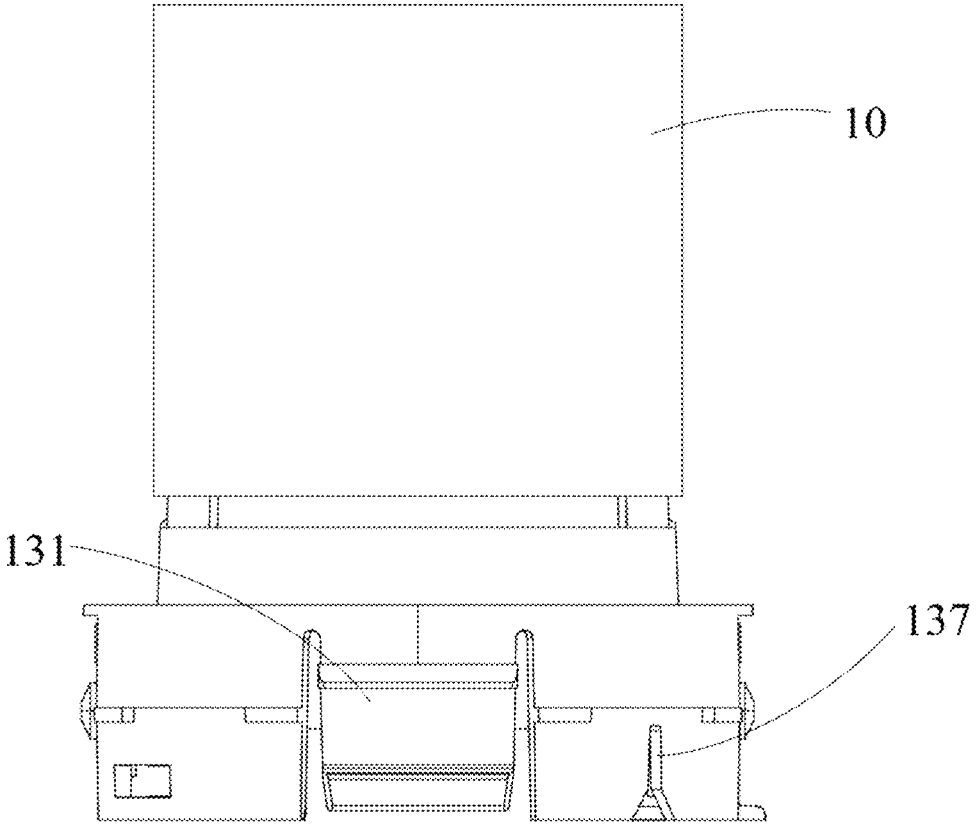
FIG. 7 is a side view of a lamp in accordance with an example of the present disclosure from another perspective.

As shown in FIG. 1 and FIG. 7, the outer peripheral wall of the secondary optical element 30 is further formed with a foolproof strip 33 arranged in the vertical direction, and the inner side wall of the lower shell 13 is correspondingly provided with a foolproof groove 137 opened along the vertical direction. The foolproof groove 137 is configured for the foolproof strip 33 to be inserted therein, so that the secondary optical element 30 is installed on the lamp body 10 in an unique way. It should be understood that, the structure for implementing the above-described foolproof installation mode is not unique, as long as it can realize the foolproof installation.

To sum up, according to the present disclosure, an operating member 132 that is bent inwardly is arranged at the bottom of the first elastic member 131, so that the lamp body 10 can be separated from the cover ring 20 by using the operating member 132, which allows for the lamp body 10 to be installed and disassembled conveniently and reduces the damage to the installation surface. Moreover, with the arrangement of the limiting structures, an excessive rotation of the lamp body 10 is prevented, and the safety is improved. By using the fixing bracket 122 as a wire fixer structure and by additionally providing the sawtooth structure 1225, the stability of wire fixation is improved, and the number of the components is reduced. Correspondingly, the structure is compact, simple, and reliable. The present disclosure is not only applicable to the lamp 100, but also applicable to downlights and various embedded-installation lamps.

The purpose of the present disclosure is to provide a lamp and make the internal structure of the lamp compact, and to improve maintenance efficiency and safety.

In order to solve the above problem, the present disclosure provides a lamp, the lamp includes a lamp body and a cover ring sleeved on an outer side of a bottom of the lamp body, the lamp body is rotatable relative to the cover ring, and an outer side wall of the bottom of the lamp body is provided with a first limiting member extending horizontally, the first limiting member is configured to limit a position of the lamp body in a vertical direction; the first limiting member is provided with a second limiting member protruding outwardly; an inner side wall of the cover ring is provided with a third limiting member corresponding to the second limiting member; in a case that the lamp body is rotated relative to the cover ring, the second limiting member and the third limiting member are interfered with each other to prevent the lamp body from rotating unrestrictedly.

As a further improvement of the present disclosure, the inner side wall of the cover ring is provided with a boss which is annular and protruded, the boss is abutted against the first limiting member, and the third limiting member is arranged below the boss.

As a further improvement of the present disclosure, at least one first limiting member is provided, the at least one first limiting member is provided with the second limiting member, and only one of the at least one first limiting member is provided with the second limiting member; the lamp body is unidirectionally rotatable relative to the cover ring by a maximum angle of 0 degree to 354 degrees.

As a further improvement of the present disclosure, the lamp body is provided with a deformable first elastic member, the first elastic member is connected to the cover ring; the lamp further comprises a secondary optical element arranged inside the lamp body, an opening of the secondary optical element faces downwards, and an outer peripheral wall of the secondary optical element is provided with a second elastic member extending towards the lamp body; the first elastic member is correspondingly provided with a cooperating member which is clamp-fitted with the second elastic member to fix the secondary optical element inside the lamp body; a groove which is annular is formed at an inner side of the bottom of the cover ring, and a bottom of the secondary optical element is limited and accommodated in the groove.

As a further improvement of the present disclosure, the lamp body comprises an upper shell, a light source assembly and a lower shell; the light source assembly is arranged between the upper shell and the lower shell; a cavity is formed inside the lower shell and configured to allow light from the light source assembly to exit therethrough; and both the first limiting member and the second limiting member are arranged on an outer side wall of the lower shell.

In order to solve the above problem, the present disclosure provides a lamp, the lamp includes a lamp body and a light source assembly arranged inside the lamp body, in which the light source assembly comprises a base substrate, a fixing bracket and a power line, the base substrate and the fixing bracket are fixedly connected to clamp and fix the power line between the base substrate and the fixing bracket.

As a further improvement of the present disclosure, the fixing bracket is arranged below the base substrate, and one side of the fixing bracket is formed with a concave part which is recessed downwardly; the concave part is configured to accommodate the power line, a sawtooth structure abutted against the power line is arranged in the concave part, and the sawtooth structure is configured to prevent the power line from moving; two sides of the concave part are also provided with a locking part respectively, and a locking hole is formed in the locking part so that the concave part is locked and fixed with the lamp body by using a locking member to pass through the locking hole.

As a further improvement of the present disclosure, a wire outlet hole is formed between the base substrate and the concave part, and the power line extends out of the lamp body through the wire outlet hole; two sides of the concave part are provided with a cantilever connected with the fixing bracket respectively, and the concave part is elastically deformable relative to the fixing bracket through the cantilever.

As a further improvement of the present disclosure, the lamp body comprises an upper shell and a lower shell which are arranged one above another; the light source assembly is arranged between the upper shell and the lower shell, a bottom of the upper shell is provided with an abutment surface, the fixing bracket is connected with the abutment surface to clamp and fix the base substrate between the fixing bracket and the abutment surface; two sides of the concave part are connected with the abutment surface through the locking part respectively to clamp and fix the power line between the abutment surface and the concave part.

As a further improvement of the present disclosure, a heat dissipation assembly connected with the light source assembly is arranged in the upper shell, and the heat dissipation assembly comprises a plurality of fins; in a case that the fixing bracket is connected to the abutment surface, the abutment surface is abutted against the base substrate.

As a further improvement of the present disclosure, an upper end of the upper shell is provided with a wire outlet slot, the wire outlet slot is formed at a side edge of the upper shell; one end of the power line is welded and fixed on the base substrate, and the other end of the power line passes through the wire outlet hole and the upper shell until extending out of the lamp body along the wire outlet slot.

As a further improvement of the present disclosure, the light source assembly further comprises a primary optical element, a cavity is formed in the lower shell and configured to allow light from the light source assembly to exit therethrough, and the primary optical element is arranged in the cavity.

In order to solve the above problem, the present disclosure further provides a lamp, and the lamp includes a lamp body and a cover ring assembled and fixed with the lamp body, in which the lamp body is provided with a first elastic member, and the lamp body is detachably connected with the cover ring through the first elastic member; a bottom of the first elastic member is formed with an operating member which is bent inwardly; and in a case that the operating member is pressed, the first elastic member is separated from the cover ring so that the lamp body is separated from the cover ring.

As a further improvement of the present disclosure, an inner side wall of the cover ring is provided with a boss which is annular and protruded, an outer wall surface of the first elastic member is provided with a clamping member which is clamp-fitted with the boss; the boss is configured to support the clamping member so as to install and fix the lamp body in the cover ring; the boss and the clamping member are provided with guide slopes cooperated with each other; the clamping member is pressed against the boss along the guide slopes from a position under the boss until moving to a position above the boss, so that an upper surface of the boss is abutted against a lower surface of the clamping member.

As a further improvement of the present disclosure, the lamp further includes a secondary optical element arranged inside the lamp body, an opening of the secondary optical element faces downwards, and an outer peripheral wall of the secondary optical element is provided with a second elastic member extending towards the lamp body; the first elastic member is provided with a cooperating member which is clamp-fitted with the second elastic member to fix the secondary optical element inside the lamp body; the outer peripheral wall of the secondary optical element is further formed with a foolproof strip arranged in a vertical direction, and an inner side wall of the lamp body is correspondingly provided with a foolproof groove opened along the vertical direction; the foolproof groove is configured for the foolproof strip to be inserted therein, so that the secondary optical element is installed on the lamp body in an unique way.

The present disclosure achieves the following beneficial effects: an operating member that is bent inwardly is arranged at the bottom of the first elastic member, so that the lamp body can be separated from the cover ring by using the operating member, which allows for the lamp body to be installed and disassembled conveniently and reduces the damage to the installation surface. Moreover, with the arrangement of the limiting structures, an excessive rotation of the lamp body is prevented, and the safety is improved. By using the fixing bracket as a wire fixer structure and by additionally providing the sawtooth structure, the stability of wire fixation is improved, and the number of the components is reduced. Correspondingly, the structure is compact, simple, and reliable. The present disclosure is not only applicable to lamps, but also applicable to downlights and various embedded-installation lamps.

According to the present disclosure, the lamp body can be conveniently installed and disassembled, and the damage to the installation surface is reduced. Moreover, with the arrangement of limiting structures, an excessive rotation of the lamp body is prevented, and the safety is improved. By using a fixing bracket as a wire fixer structure and by additionally providing a sawtooth structure, the stability of pressing wire is improved, and the number of components is reduced. Therefore, the structure is compact, simple, and reliable.

The above examples are only used to illustrate but not limit the technical solution of the present disclosure. Although the present disclosure has been described in details with reference to examples, it should be understood by those skilled in the art that the technical solution of the present disclosure can be modified or replaced by equivalents without departing from the spirit and scope of the technical solution of the present disclosure.

What is claimed is:

1. A lamp, comprising a lamp body and a cover ring sleeved on an outer side of a bottom of the lamp body, the lamp body being rotatable relative to the cover ring, wherein:

an outer side wall of the bottom of the lamp body is provided with a first limiting member extending horizontally, the first limiting member is configured to limit a position of the lamp body in a vertical direction; and the first limiting member is provided with a second limiting member protruding outwardly; and an inner side wall of the cover ring is provided with a third limiting member corresponding to the second limiting member; and in a case that the lamp body is rotated relative to the cover ring, the second limiting member and the third limiting member are interfered with each other to prevent the lamp body from rotating unrestrictedly;

wherein the inner side wall of the cover ring is provided with a boss which is annular and protruded, the boss is abutted against the first limiting member, and the third limiting member is arranged below the boss.

2. The lamp according to claim 1, wherein:

at least one first limiting member is provided, the at least one first limiting member is provided with the second limiting member, and only one of the at least one first limiting member is provided with the second limiting member; and the lamp body is unidirectionally rotatable relative to the cover ring by a maximum angle of 0 degree to 354 degrees.

3. The lamp according to claim 1, wherein:

the lamp body is provided with a deformable first elastic member, the first elastic member is connected to the cover ring;

the lamp further comprises a secondary optical element arranged inside the lamp body, an opening of the secondary optical element faces downwards, and an outer peripheral wall of the secondary optical element is provided with a second elastic member extending towards the lamp body;

the first elastic member is correspondingly provided with a cooperating member which is clamp-fitted with the second elastic member to fix the secondary optical element inside the lamp body; and a groove which is annular is formed at an inner side of the bottom of the cover ring, and a bottom of the secondary optical element is limited and accommodated in the groove.

4. The lamp according to claim 1, wherein:

the lamp body comprises an upper shell, a light source assembly and a lower shell; the light source assembly is arranged between the upper shell and the lower shell;

a cavity is formed inside the lower shell and configured to allow light from the light source assembly to exit therethrough; and both the first limiting member and the second limiting member are arranged on an outer side wall of the lower shell.

5. A lamp, comprising a lamp body and a cover ring assembled and fixed with the lamp body, wherein the lamp body is provided with a first elastic member, and the lamp body is detachably connected with the cover ring through the first elastic member; a bottom of the first elastic member is formed with an operating member which is bent inwardly; and in a case that the operating member is pressed, the first elastic member is separated from the cover ring so that the lamp body is separated from the cover ring, wherein an inner side wall of the cover ring is provided with a boss which is annular and protruded, an outer wall surface of the first elastic member is provided with a clamping member which is clamp-fitted with the boss, wherein the boss is configured to support the clamping member so as to install and fix the lamp body in the cover ring; the boss and the clamping member are provided with guide slopes cooperated with each other, and wherein the clamping member is pressed against the boss along the guide slopes from a position under the boss until moving to a position above the boss, so that an upper surface of the boss is abutted against a lower surface of the clamping member.

6. The lamp according to claim 5, wherein:

the lamp further comprises a secondary optical element arranged inside the lamp body, an opening of the secondary optical element faces downwards, and an outer peripheral wall of the secondary optical element is provided with a second elastic member extending towards the lamp body;

the first elastic member is provided with a cooperating member which is clamp-fitted with the second elastic member to fix the secondary optical element inside the lamp body;

the outer peripheral wall of the secondary optical element is further formed with a foolproof strip arranged in a vertical direction, and an inner side wall of the lamp body is correspondingly provided with a foolproof groove opened along the vertical direction; and the foolproof groove is configured for the foolproof strip to be inserted therein, so that the secondary optical element is installed on the lamp body in an unique way.

* * * * *